(12) United States Patent
Kim et al.

(10) Patent No.: US 12,094,154 B2
(45) Date of Patent: Sep. 17, 2024

(54) ELECTRONIC DEVICE FOR PREDICTING POSE AND OPERATING METHOD THEREOF

(71) Applicants: SAMSUNG ELECTRONICS CO., LTD., Suwon-si (KR); Korea University Research and Business Foundation, Seoul (KR)

(72) Inventors: Yuntae Kim, Suwon-si (KR); Sanghoon Sull, Seoul (KR); Seongwook Yoon, Seoul (KR); Donghoon Sagong, Suwon-si (KR); Heejeong Lim, Seoul (KR); Hojin Ju, Seongnam-si (KR); Jaehwan Pi, Seoul (KR)

(73) Assignees: SAMSUNG ELECTRONICS CO., LTD., Suwon-si (KR); Korea University Research and Business Foundation, Seoul (KR)

( * ) Notice: Subject to any disclaimer, the term of this patent is extended or adjusted under 35 U.S.C. 154(b) by 384 days.

(21) Appl. No.: 17/704,894

(22) Filed: Mar. 25, 2022

(65) Prior Publication Data
US 2023/0064242 A1 Mar. 2, 2023

(30) Foreign Application Priority Data
Aug. 23, 2021 (KR) .................. 10-2021-0111206

(51) Int. Cl.
*G06K 9/00* (2022.01)
*G06T 7/277* (2017.01)
*G06T 7/70* (2017.01)

(52) U.S. Cl.
CPC ................ *G06T 7/70* (2017.01); *G06T 7/277* (2017.01); *G06T 2207/20081* (2013.01); *G06T 2207/20084* (2013.01)

(58) Field of Classification Search
CPC ............... G06T 19/006; G06T 7/70; G06T 2207/10016; G06T 2207/30244;
(Continued)

(56) References Cited

U.S. PATENT DOCUMENTS

| 10,824,947 B2 | 11/2020 | Kim et al. |
| 2015/0228118 A1* | 8/2015 | Eade .................... G02B 27/017 345/633 |
| 2016/0260251 A1 | 9/2016 | Stafford et al. |
| 2017/0115488 A1* | 4/2017 | Ambrus ............. G02B 27/0172 |
| 2017/0213388 A1* | 7/2017 | Margolis ................. G06T 13/00 |

FOREIGN PATENT DOCUMENTS

| KR | 10-1511146 B1 | 4/2015 |
| KR | 10-1836742 B1 | 3/2018 |
| KR | 10-2018-0129140 A | 12/2018 |

OTHER PUBLICATIONS

Joppich, M., et al., "Adaptive Human Motion Prediction using Multiple Model Approaches", Virtual Reality Group, Center for Computing & Communication, RWTH Aachen University, (2016), 12 pages.

(Continued)

*Primary Examiner* — Alex Kok S Liew
(74) *Attorney, Agent, or Firm* — Sughrue Mion, PLLC

(57) ABSTRACT

An electronic device includes a memory storing a plurality of motion prediction models, and a processor configured to estimate a current pose of the electronic device based on external data; predict a first motion of the electronic device at a future first prediction time through a first model in which the plurality of motion prediction models are combined for the future first prediction time, and calculate a first pose of the electronic device at the first prediction time based on the current pose and the first motion; and predict a second motion of the electronic device at a future second prediction time through a second model in which the plurality of motion prediction models are combined for the future second prediction time, and calculate a second pose of the (Continued)

electronic device at the second prediction time based on the first pose and the second motion.

20 Claims, 15 Drawing Sheets

(58) Field of Classification Search
CPC ............ G06T 2207/20081; G06T 7/73; G06T 2207/20084; G06T 7/20; G06T 7/246; G06T 11/60; G06T 2207/10024; G06T 7/579; G06T 11/00; G06T 7/11; G06T 19/20; G06T 2207/30241; G06T 2200/24; G06T 2207/30196; G06T 7/248; G06T 2207/10028; G06T 2207/30252; G06T 2219/2004; G06T 7/33; G06T 7/74; G06F 3/011; G06F 3/012; G06F 3/013; G06F 3/017; G06F 3/0346; G06F 3/167; G06F 2113/10; G06F 3/04815; G06F 3/04842; G06F 30/27; G06F 3/0304; G06F 16/182; G06F 16/24537; G06F 16/24544
See application file for complete search history.

(56) References Cited

OTHER PUBLICATIONS

Gul, S., et al., "Kalman Filter-based Head Motion Prediction for Cloud-based Mixed Reality", Poster Session B3: Multimedia System and Middleware & Multimedia Telepresence and Virtual/Augmented Reality, Proceedings of the 28th ACM International Conference on Multimedia. (Oct. 12-16, 2020), pp. 3632-3641, 10 pages. https://doi.org/10.1145/3394171.3413699.

Aykut, T., et al., "Realtime 3D 360-Degree Telepresence With Deep-Learning-Based Head-Motion Prediction", IEEE Journal on Emerging and Selected Topics in Circuits and Systems 9.1 (2019): 231-244, 16 pages. http://dx.doi.org/10.1109/JETCAS.2019.2897220.

Hou, X., et al., "Head and Body Motion Prediction to Enable Mobile VR Experiences with Low Latency", (2019), pp. 1-7, IEEE Global Communications Conference (Globecom).

* cited by examiner

ELECTRONIC DEVICE FOR PREDICTING POSE AND OPERATING METHOD THEREOF

CROSS-REFERENCE TO RELATED APPLICATION

This application is based on and claims priority under 35 U.S.C. § 119 to Korean Patent Application No. 10-2021-0111206, filed on Aug. 23, 2021, in the Korean Intellectual Property Office, the disclosure of which is incorporated by reference herein in its entirety.

BACKGROUND

1. Field

The present disclosure relates to electronic devices for predicting a pose of an object and operating methods thereof.

2. Description of the Related Art

Augmented reality (AR) refers to a technology that makes objects appear as if they exist in an original environment by synthesizing virtual objects or information in an actual environment. Augmented reality technology may provide an intuitive user experience, such as voice recognition, gaze recognition, and hand gesture recognition, and may also provide various services in various fields, such as education, industry, medical care, or entertainment.

Augmented reality has been developed in the form of various types of wearable devices that may be worn on the human body. Among them, a glass type wearable device is mounted on a user's head, and may provide an augmented reality service to a user through a display on the glass type wearable device.

The wearable device may estimate a pose of the wearable device worn by a user through various digital processing technologies, such as computer vision or simultaneous localization and mapping (SLAM), and may provide an image related to the pose of the wearable device through a display.

In augmented reality services provided through a wearable device, it is important for a user to feel as if the provided services are real. For example, when an error occurs between an image provided to a user through a display and an actual pose of the wearable device, the user may feel uncomfortable.

However, due to a latency that is inevitably generated in a process of estimating a current pose of the wearable device through digital processing, securing a real-time with respect to an image provided to the user only by estimating the current pose of the wearable device may be difficult.

Accordingly, there is a need for a method capable of compensating for latency generated in a digital processing process, and recently, methods of compensating for latency by predicting a pose at a future time of a wearable device have been proposed.

SUMMARY

One or more example embodiments provide an electronic device capable of accurately predicting a pose of an object or the electronic device even in an environment in which a pose prediction time is variable, and an operating method thereof by dividing a pose prediction time into a plurality of times and predicting a future pose by combining optimal motion prediction models for each prediction time.

The problems to be solved through the embodiments of the present disclosure are not limited to the above-mentioned problems, and the problems not mentioned are clearly understood by those of ordinary skill in the art to which the embodiments belong from the present disclosure and the accompanying drawings.

Additional aspects will be set forth in part in the description which follows and, in part, will be apparent from the description, or may be learned by practice of the presented embodiments of the disclosure.

According to an aspect of an embodiment, an electronic device includes: a memory for storing a plurality of motion prediction models; and a processor configured to: estimate a current pose of the electronic device from the acquired external data; predict a first motion of the electronic device at a future first prediction time through a first model in which the plurality of motion prediction models are combined for the future first prediction time, calculate a first pose of the electronic device at the first prediction time based on the current pose and the first motion; predict a second motion of the electronic device at a future second prediction time through a second model in which the plurality of motion prediction models are combined for the future second prediction time, and calculate a second pose of the electronic device at the second prediction time based on the first pose and the second motion.

The electronic device may further include: a camera configured to acquire image data for surrounding objects; and an inertial sensor configured to acquire inertial data of the electronic device, wherein the external data may include at least one of the image data and the inertial data.

The processor may be further configured to extract features from the external data, and estimate the current pose of the electronic device by performing Kalman filtering or bundle adjustment on the extracted features.

The plurality of motion prediction models may include a first motion prediction model for predicting a future motion of the electronic device through the current pose of the electronic device and a second motion prediction model for predicting the future motion of the electronic device through machine learning.

The second motion prediction model may predict the future motion through at least one of regression analysis, an artificial neural network, a convolutional neural network, and a recurrent neural network.

The processor may be further configured to acquire the first model or the second model through a weighted average of the first motion prediction model and the second motion prediction model.

The processor may be further configured to adjust a first weight assigned to the first motion prediction model and a second weight assigned to the second motion prediction model according to a prediction time of a motion of the electronic device.

The processor may be further configured to adjust the first weight and the second weight based on a weight selection model obtained through machine learning.

The processor may be further configured to: calculate a motion prediction score indicating precision of motion prediction for each combination of a plurality of weights assigned to the first motion prediction model and a plurality of weights assigned to the second motion prediction model, and adjust the first weight and the second weight based on the calculated motion prediction score.

The processor may be further configured to increase a magnitude of the second weight as a time difference between the prediction time of the motion of the electronic device and the current time increases.

The processor may be further configured to calculate the first pose and the second pose through a motion model including a relational expression between a pose of the electronic device and a motion of the electronic device.

According to an aspect of another embodiment, an operating method of an electronic device, the operating method includes: estimating a current pose of the electronic device based on external data; predicting a first motion of the electronic device at a future first prediction time through a first model in which a plurality of motion prediction models are combined for the future first prediction time; calculating a first pose of the electronic device at the first prediction time based on the current pose and the first motion; predicting a second motion of the electronic device at a future second prediction time through a second model in which a plurality of motion prediction models are combined for the future second prediction time; and calculating a second pose of the electronic device at the second prediction time based on the first pose and the second motion.

The operating method may further include: acquiring image data for a surrounding object through a camera; and acquiring inertia data of the electronic device through an inertia measurement device, wherein the image data and the inertia data may be acquired as the external data.

The estimating of the current pose may include: extracting features from the external data; and estimating the current pose of the electronic device by performing Kalman filtering or bundle adjustment on the extracted features.

The plurality of motion prediction models may include a first motion prediction model for predicting a future pose of the electronic device through the current pose of the electronic device, and a second motion prediction model for predicting the future pose of the electronic device through machine learning.

The calculating of the first pose may include acquiring the first model through a weighted average of the first motion prediction model and the second motion prediction model.

The calculating of the second pose may include acquiring the second model through the weighted average of the first motion prediction model and the second motion prediction model.

The obtaining of the first model or obtaining of the second model may include: adjusting a first weight assigned to the first motion prediction model according to a motion prediction time of the electronic device; and adjusting a second weight assigned to the second motion prediction model according to the motion prediction time of the electronic device.

The first weight or the second weight may be adjusted by using a weight selection model acquired through machine learning.

The first weight or the second weight may be adjusted by using a motion prediction score calculated for each combination of a plurality of weights assigned to the first motion prediction model and a plurality of weights assigned to the second motion prediction model.

According to an aspect of another embodiment, provided is a non-transitory computer-readable recording medium in which a program for executing the operating method described above in a computer is recorded.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
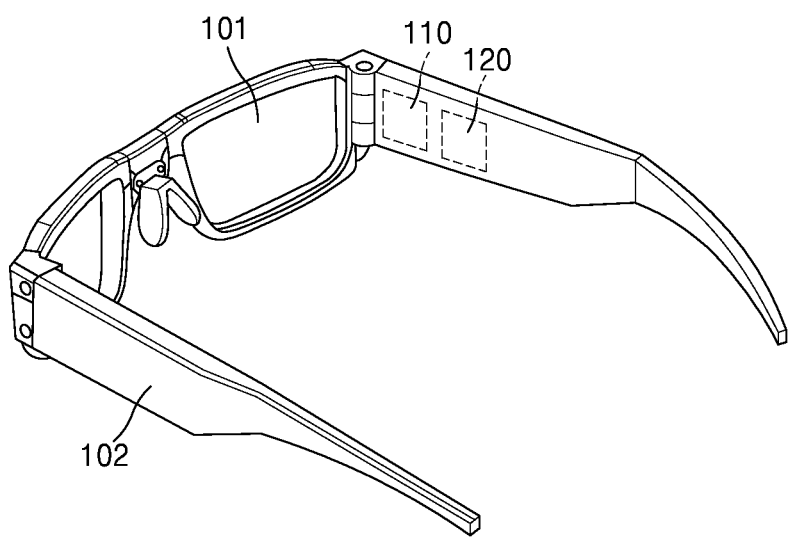
FIG. 1 is a perspective view of an electronic device according to an embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail. As used herein, the term "and/or" includes any and all combinations of one or more of the associated listed items. Expressions such as "at least one of," when preceding a list of elements, modify the entire list of elements and do not modify the individual elements of the list.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of the embodiments, it will be understood that, when an element is referred to as being connected to another element, it may include electrically connected when the element is directly connected to the other element and when the element is indirectly connected to the other element by intervening a constituent element. Also, it should be understood that, when a part "comprises" or "includes" a constituent element in the specification, unless otherwise defined, it is not excluding other elements but may further include other elements.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

It will be understood that, although the terms 'first', 'second', etc. may be used herein to describe various constituent elements, these constituent elements should not be limited by these terms. These terms are only used to distinguish one constituent element from another.

In addition, a 'world coordinate system' used in the present disclosure may denote a three-dimensional coordinate system set based on the real world.

The descriptions of the embodiments should not be interpreted as limiting the scope of right, and embodiments that are readily inferred from the detailed descriptions and embodiments by those of ordinary skill in the art will be construed as being included in the inventive concept. Reference will now be made in detail to embodiments, examples of which are illustrated in the accompanying drawings.

FIG. 1 is a perspective view of an electronic device 100 according to an embodiment.

Referring to FIG. 1, the electronic device 100 according to an embodiment may include a data acquisition device 110 and a processor 120, estimate a current pose of the electronic device 100, and may predict a future pose of the electronic device 100 based on the estimated current pose.

According to an embodiment, the electronic device 100 may estimate a surrounding map of the electronic device 100 and/or a current pose of the electronic device 100 through simultaneous localization and mapping (SLAM).

In the present disclosure, the 'SLAM' may refer to a technique for acquiring information around a device while moving in an arbitrary space, and for estimating a map of a corresponding space and a current pose of the device based on the acquired information, and, hereinafter, the corresponding expression may be used to have the same meaning.

For example, the processor 120 of the electronic device 100 may extract features with respect to external data acquired through the data acquisition device 110 and compute on spatial coordinates, and then, may estimate a surrounding map and a current pose of the electronic device 100 by performing optimization on the extracted features and the calculated spatial coordinates. In this case, the external data acquired through the data acquisition device 110 may include image data about surrounding objects of the electronic device 100 and inertia data corresponding to the movement of the electronic device 100, but is not limited thereto.

Also, in the present disclosure, the 'pose of the electronic device' may denote data including location information of the electronic device, and, hereinafter, the corresponding expression may be used to have the same meaning. At this time, the pose data may include 6 degrees of freedom pose information, and the 6 degrees of freedom pose information may include information indicating a position of the electronic device 100 and an orientation of the electronic device 100.

According to an embodiment, the electronic device 100 may predict a future pose of the electronic device 100 based on the estimated current pose of the electronic device 100. For example, the processor 120 of the electronic device 100 may predict a future motion of the electronic device 100 through the current pose of the electronic device 100, and may calculate or predict a future pose of the electronic device 100 based on the predicted motion.

In the present disclosure, the 'motion of the electronic device' may denote a change amount or an average change amount of the pose of the electronic device 100, and, hereinafter, the corresponding expression may be used to have the same meaning.

In addition, the processor 120 of the electronic device 100 may generate an augmented reality (AR) image based on the estimated surrounding map information, a current pose of the electronic device 100, and a future pose of the electronic device 100, and display the generated augmented reality image through a display (e.g., a lens 101 of FIG. 1).

In the present disclosure, the 'augmented reality image' may denote an image in which an image of the real world around the electronic device 100 and a virtual image are combined. For example, the augmented reality image may denote an image in which a virtual image is overlaid on an image of the real world, but is not limited thereto. In this case, the image of the real world may denote a real scene that may be seen by a user through the electronic device 100, and the image of the real world may include a real world object. In addition, the virtual image refers to an image that is formed by graphic processing and does not exist in the real world, and the virtual image may include a digital or an augmented reality object (AR object).

When an augmented reality image is generated using only estimated surrounding map information and a current pose of the electronic device 100, due to a latency (or 'delay time') generated in a process of estimating the current pose of the electronic device 100, an error may occur between the augmented reality image and the actual pose of the electronic device 100. For example, due to a latency generated in a data transmission/reception process of the data acquisition device 110 and the processor 120 or in a process of estimating a current pose through the SLAM of the processor 120, an error may be generated between the augmented reality image and the actual pose of the electronic device 100.

On the other hand, the electronic device 100 according to an embodiment may compensate for the error caused by a latency between the augmented reality image and the actual pose of the electronic device 100 by predicting a future pose and generating an augmented reality image by using the predicted future pose. As a result, the electronic device 100 according to an embodiment may secure a real-time of the augmented reality image by predicting a future pose of the electronic device 100 to improve the precision of the augmented reality image.

According to an embodiment, the electronic device 100 may be a wearable electronic device that may be worn on a part of a user's body. For example, the electronic device 100 may further include a connector 102 for fixing the lens 101 and at least one region of the electronic device 100 to a part of the user's body.

In one example, as shown in FIG. 1, the electronic device 100 may be a wearable electronic device of a glasses type that may be worn on a user's ear, but is not limited thereto. In another example, the electronic device 100 may be a wearable electronic device of a head-mount type that may be worn on a user's head.

According to an embodiment, the data acquisition device 110 and the processor 120 may be arranged on the connector 102, but the arrangement structure of the data acquisition device 110 and the processor 120 is not limited thereto. In another embodiment, the data acquisition device 110 and/or the processor 120 may be arranged in a peripheral area (e.g., an edge) of the lens 101.

Although not shown in the drawing, the electronic device 100 may include optical components for emitting light including data for an augmented reality image and controlling a movement path of the emitted light. The processor 120 may emit light including data for an augmented reality image through the optical components, and control the emitted light to reach the lens 101.

As the light including data for the augmented reality image reaches the lens 101, the augmented reality image may be displayed on the lens 101, and the electronic device 100 may provide the augmented reality image to the user (or 'wearer') through the process described above.

In the previous embodiment, it has been described that only the electronic device 100 is a wearable electronic device, but the application field of the electronic device 100 is not limited thereto. According to an embodiment, the electronic device 100 may be applied to an unmanned aerial vehicle (UAV) and/or an autonomous vehicle capable of estimating a surrounding map and a current pose thereof through SLAM.

Hereinafter, optical components of the electronic device 100 will be described in detail with reference to FIG. 2.

Figure 2:
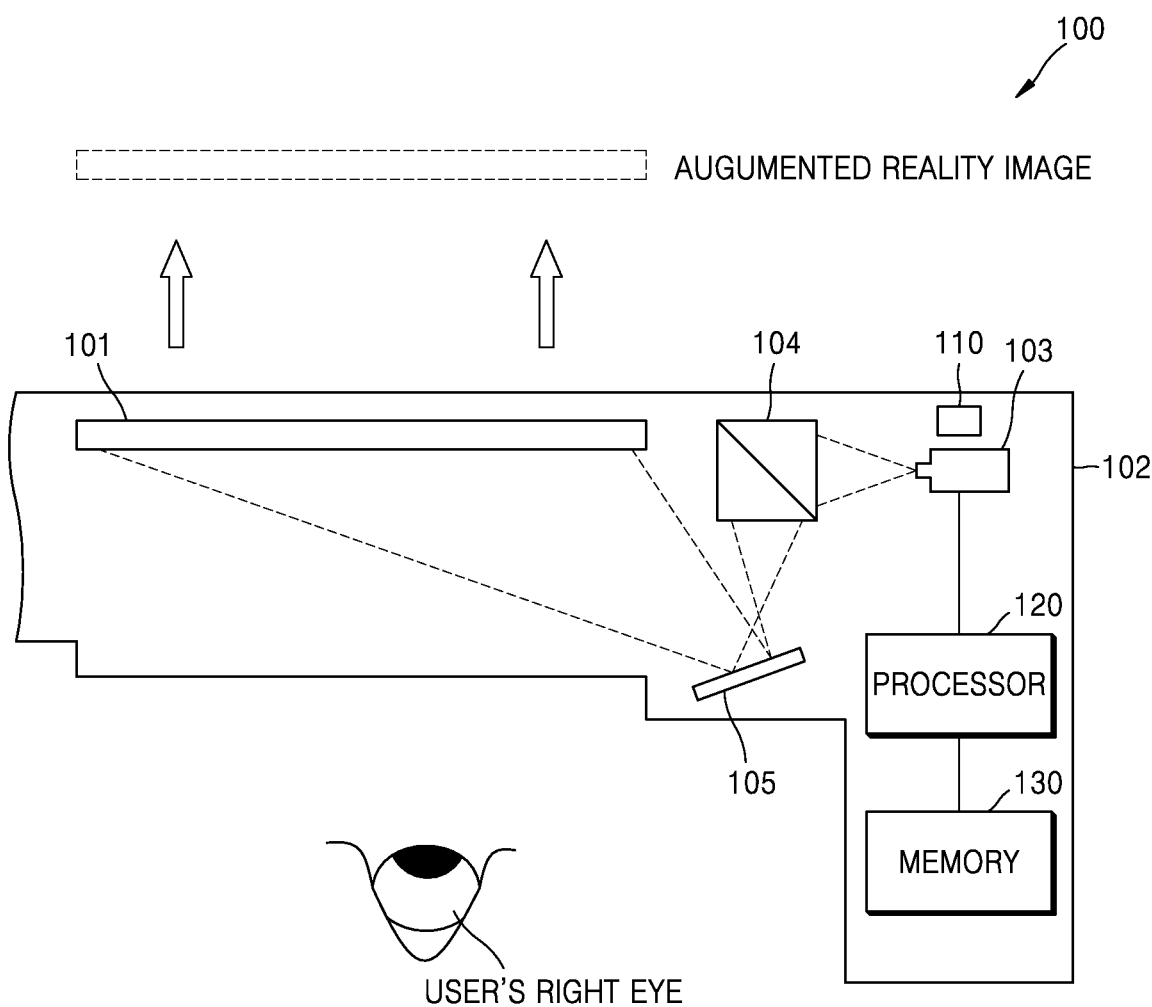
FIG. 2 is a cross-sectional view of a partial region of the electronic device shown in FIG. 1.

FIG. 2 is a cross-sectional view of a partial region of the electronic device shown in FIG. 1.

FIG. 2 illustrates a cross-section of a region adjacent to a user's right eye of the electronic device 100 shown in FIG. 1. Also, the electronic device 100 illustrated in FIG. 2 may be a wearable device (e.g., AR glasses) of a glasses type that may be worn on a user's ear, but the shape of the electronic device 100 is not limited to the illustrated embodiment.

Referring to FIG. 2, the electronic device 100 according to an embodiment may include a lens 101, a connector 102, a projector 103, a beam splitter 104, a mirror 105, and a data acquisition device 110, a processor 120, and a memory 130. At least one of the components of the electronic device 100 according to an embodiment may be the same as or similar to at least one of the components of the electronic device 100 of FIG. 1, and thus, repeated descriptions thereof will be omitted below.

The processor 120 may estimate a current pose and a surrounding map of the electronic device 100 based on external data acquired through the data acquisition device 110 and a data value stored in the memory 130, and may predict a future pose of the electronic device 100 based on the estimated current pose. For example, the processor 120 may divide a pose prediction time into a plurality of prediction times, and may predict a future pose of the electronic device 100 at each of the divided prediction times.

In addition, the processor 120 may generate an augmented reality image (AR image) based on the estimated surrounding map of the electronic device 100 and a pose of the electronic device 100 at a current pose and a future prediction time, and transmit data for the generated augmented reality image to the projector 103.

The projector 103 may emit light including data regarding the augmented reality image to the lens 101. For example, the processor 120 may be electrically or operatively connected to the projector 103 to control the operation of the projector 103, and the projector 103 may be controlled by the processor 120 to emit light including data related to an augmented reality image to the lens 101.

According to an embodiment, light emitted from the projector 103 may be reflected by the beam splitter 104 and/or the mirror 105, and then, reach the lens 101, but is not limited thereto. According to an embodiment, the projector 103 may be arranged to face the lens 101, and thus, light emitted from the projector 103 may reach the lens 101 without passing through the beam splitter 104 and/or the mirror 105.

As the light emitted from the projector 103 reaches the lens 101, an augmented reality image may be displayed on the lens 101, and, as a result, the lens 101 may be operated as a display displaying an augmented reality image of the electronic device 100.

The lens 101 may be arranged to face a user's eye (e.g., the user's right eye in FIG. 2) when the user wears the electronic device 100, and the electronic device 100 may provide an augmented reality image to the user through the lens 101.

Hereinafter, components for estimating a current pose of the electronic device 100 and predicting a future pose will be described in detail with reference to FIG. 3.

Figure 3:
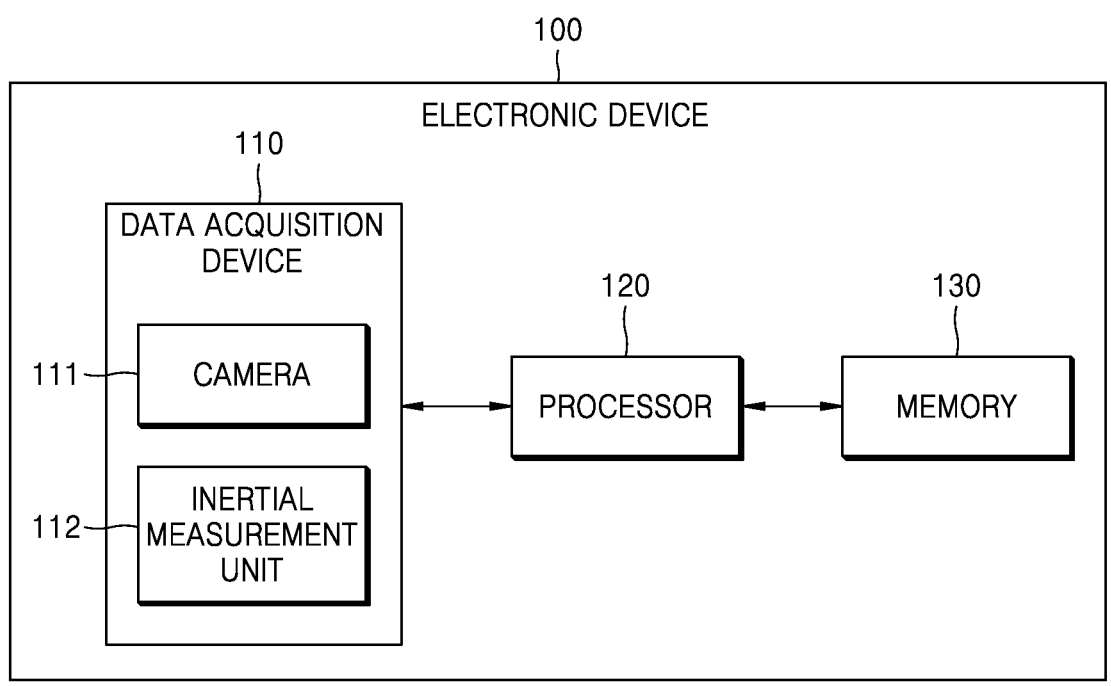
FIG. 3 is a block diagram illustrating components of an electronic device according to an embodiment.

FIG. 3 is a block diagram illustrating components of the electronic device 100 according to an embodiment.

Referring to FIG. 3, the electronic device 100 according to an embodiment may include a data acquisition device 110, a processor 120, and a memory 130. At least one of the components of the electronic device 100 according to an embodiment may be the same as or similar to at least one of the components of the electronic device 100 illustrated in FIGS. 1 and/or 2, and thus, duplicate descriptions will be omitted below.

The data acquisition device 110 may acquire external data including image data on objects surrounding the electronic device 100 and/or data on the movement of the electronic device 100. The data acquisition device 110 and the processor 120 may be electrically or operationally connected, and external data acquired by the data acquisition device 110 may be transmitted to the processor 120.

According to an embodiment, the data acquisition unit 110 may include a camera 111 and an inertial measurement unit (IMU) 112, and external data may be acquired through the camera 111 and/or the IMU 112. The IMU 112 may be also referred to as an inertial sensor.

In one example, the camera 111 is a device capable of capturing an image of a surrounding environment, and the processor 120 may acquire image data with respect to surrounding objects of the electronic device 100 through the camera 111.

In another example, the IMU 112 is a device capable of measuring a motion, a gravity, and/or an angular rate of the electronic device 100 in a three-dimensional space, and the processor 120 may acquire inertia data corresponding to the movement of the electronic device 100 through the IMU 112. The IMU 112 may include a gyroscope to a measure angular rate, an accelerometer to measure a force or an acceleration, and/or a magnetometer to measure a magnetic field surrounding the electronic device 100. For example, the inertia data may include data regarding at least one of a position, an orientation, an acceleration, and an angular velocity, but is not limited thereto.

The processor 120 may be electrically or operatively connected to the data acquisition device 110 and/or the memory 130, and may adjust an overall operation of the electronic device 100 based on the external data acquired by the data acquisition device 110 and data stored in the memory 130.

For example, the processor 120 may be implemented as an array of a plurality of logic gates, or may be implemented as a combination of a general-purpose microprocessor and a memory in which a program that may be executed in a microprocessor is stored. However, the type of the processor 120 is not limited to the embodiment described above, and may be implemented as other types of hardware according to another embodiment.

The processor 120 may estimate a surrounding map and a current pose of the electronic device 100 based on the external data acquired by the data acquisition device 110 and data stored in the memory 130, and may predict a future pose of the electronic device 100 at a plurality of future prediction times.

According to an embodiment, the processor 120 may extract features based on external data acquired through the data acquisition device 110, and may perform an operation on spatial coordinates. For example, the processor 120 may extract features of a surrounding object from an image of the surrounding object through a feature detection algorithm, but is not limited thereto.

In an embodiment, the processor 120 may estimate a current pose and a surrounding map of the electronic device 100 by performing Kalman filtering or bundle adjustment based on the features and the spatial coordinates extracted from the surrounding object. For example, the processor 120 may generate optimal data (or 'optimal solution') with reduced errors by performing bundle adjustment or Kalman filtering on the extracted features, and predict a surrounding map and a current pose of the electronic device 100 based on the generated optimal data and calculated spatial coordinates, but is not limited thereto. In this case, the data on the surrounding map and the current pose of the electronic device 100 estimated through the processor 120 may be stored in the memory 130 electrically connected to the processor 120.

According to an embodiment, the processor 120 may predict a future pose of the electronic device 100 based on the current pose of the electronic device 100 stored in the memory 130. For example, the processor 120 may divide a maximum prediction time into a plurality of prediction times and predict a pose of the electronic device 100 at the plurality of prediction times.

In the present embodiment, the 'maximum prediction time' may denote a threshold time during which the processor 120 may predict a future pose of the electronic device 100. For example, the processor 120 may predict a pose of the electronic device 100 with respect to a time within the maximum prediction time from the present, however, the processor 120 may not predict a pose of the electronic device 100 with respect to a time outside the maximum prediction time. In this case, the maximum prediction time may be divided into a regular time interval, but may also be divided into an irregular time interval according to embodiments.

In an embodiment, the processor 120 may predict a motion of the electronic device 100 at a plurality of prediction times based on the latest external data acquired through the data acquisition device 110 and the current pose of the electronic device 100 stored in the memory 130, and a pose of the electronic device 100 at a plurality of prediction times may be calculated or predicted through the predicted motion.

For example, the processor 120 may predict a motion of the electronic device 100 at a plurality of prediction times by combining a plurality of motion prediction models, and may calculate or predict a pose of the electronic device 100 at a plurality of prediction times through a motion model.

In the present disclosure, the 'motion prediction model' may refer to a model capable of predicting a future motion of the electronic device 100 through a current pose of the electronic device 100. In addition, in the present disclosure, a 'motion model' may denote a model capable of predicting a pose of the electronic device 100 through a motion of the electronic device 100, and, hereinafter, the corresponding expression may be used to have the same meaning.

In an example, the processor 120 may predict a first motion of the electronic device 100 at a future first prediction time through a first model in which a plurality of motion prediction models are combined, and may calculate or predict a first pose at the first prediction time based on the first motion.

In another example, the processor 120 may predict a second motion of the electronic device 100 at a future second prediction time through a second model in which a plurality of motion prediction models are combined, and may calculate or predict a second pose at the second prediction time based on the second motion.

In this case, the processor 120 may predict a future motion of the electronic device 100 by combining optimal motion prediction models according to a prediction time, but a detailed description thereof will be provided later.

The processor 120 may generate an augmented reality image through a surrounding map and a current pose of the electronic device 100 acquired through the operations described above and future poses of the electronic device 100 at a plurality of predicted times. The processor 120 may display an augmented reality image generated through a display of the electronic device 100, and, through this process, may provide the augmented reality image to the user.

Data necessary for controlling the operation of the electronic device 100 may be stored in the memory 130, and the processor 120 may control the operation of the electronic device 100 based on the data stored in the memory 130.

In one example, the memory 130 may store data on a pose of the electronic device 100 estimated through the processor 120, but is not limited thereto. In another example, the memory 130 may store a plurality of motion prediction models for predicting a future motion of the electronic device 100 and a motion model for predicting a future pose of the electronic device 100.

Figure 4:
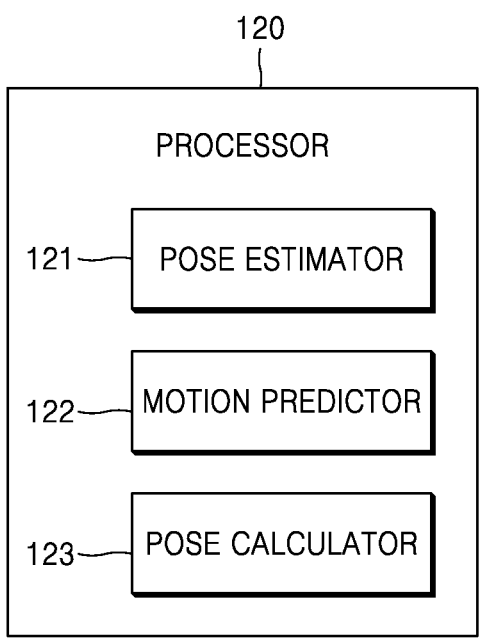
FIG. 4 is a block diagram illustrating components of a processor according to an embodiment.
Figure 5:
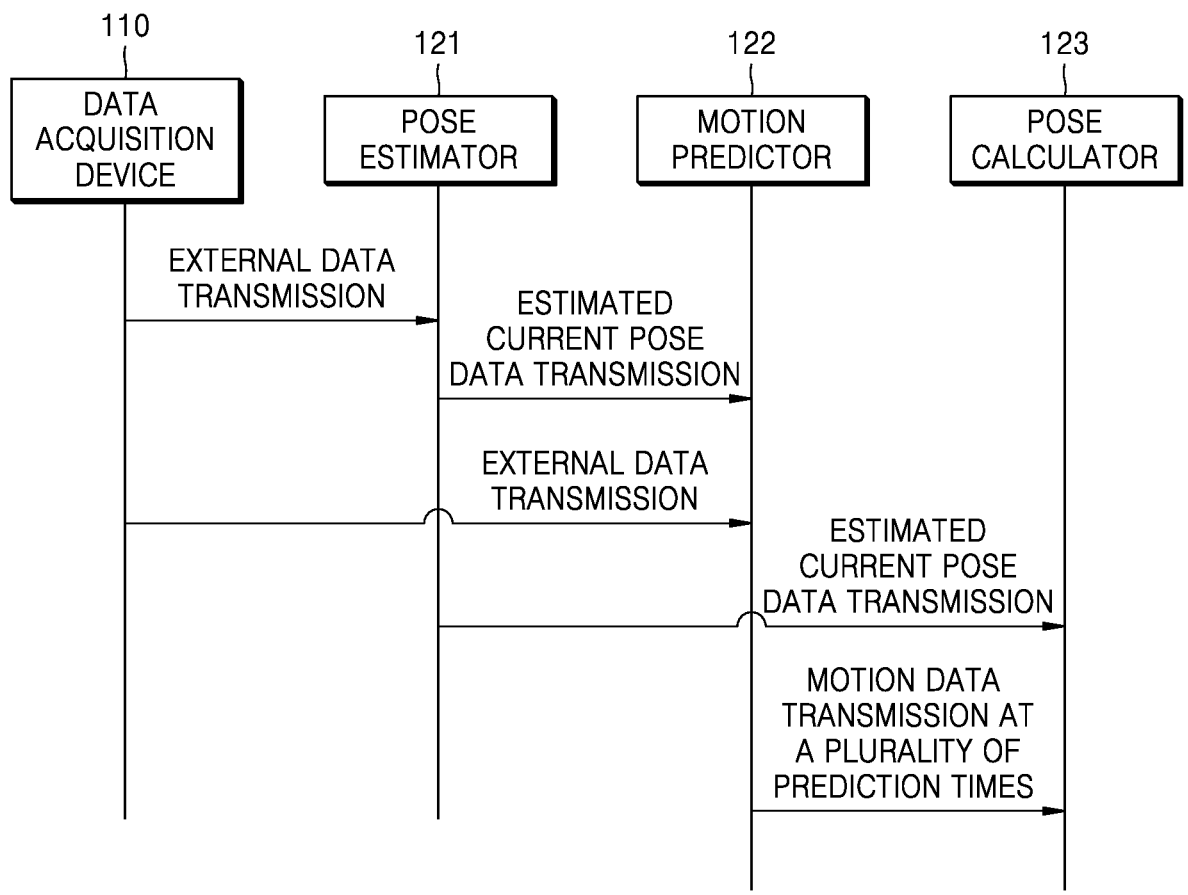
FIG. 5 is a diagram illustrating a data transmission process between components of an electronic device according to an embodiment.

FIG. 4 is a block diagram illustrating components of a processor according to an embodiment. FIG. 5 is a diagram illustrating a data transmission process between components of an electronic device according to an embodiment.

The processor of FIG. 4 may be the processor 120 of the electronic device 100 according to an embodiment shown in FIG. 3. FIG. 5 shows a data transmission process between the data acquisition device 110 and the components of the processor 120 of FIG. 4.

Referring to FIGS. 4 and 5, the processor 120 according to an embodiment may include a pose estimator 121, a motion predictor 122, and a pose calculator 123.

The pose estimator 121 may be electrically or operatively connected to a data acquisition device 110 (e.g., the data acquisition device 110 of FIG. 3), extract features from external data received from the data acquisition device 110, and may estimate a current pose of an electronic device (e.g., the electronic device 100 of FIGS. 1 and 3) through the extracted features.

In one embodiment, the pose estimator 121 may extract features of surrounding objects from an image of the surrounding objects received from the data acquisition device 110 through a feature extraction algorithm, and may calculate spatial coordinates based on inertia data of the electronic device.

For example, the pose estimator 121 may generate optimization data with reduced errors by performing Kalman filtering or bundle adjustment with respect to the extracted features of the surrounding objects, and may estimate a current pose of the electronic device based on the generated optimization data and spatial coordinates. In this case, data on the current pose of the electronic device estimated through the pose estimator 121 may be transmitted or transferred to the motion predictor 122.

The motion predictor 122 may be electrically or operatively connected to the data acquisition device and the pose estimator 121, and may predict a future motion of the electronic device based on external data acquired by the data acquisition device and the current pose of the electronic device estimated by the pose estimator 121.

In an embodiment, the motion predictor 122 may divide the maximum prediction time for predicting a pose of the electronic device into a plurality of prediction times, and may predict a future motion of the electronic device at each prediction time.

For example, the motion predictor 122 may combine a plurality of optimal motion prediction models according to each prediction time, and may predict a motion of the electronic device at each prediction time by applying latest external data and a current pose or a predicted pose of the electronic device to the combined motion prediction model. In this case, data with respect to motions of the electronic device at a plurality of prediction times estimated through the motion predictor 122 may be transmitted or transferred to the pose calculator 123.

The pose calculator 123 may be electrically or operatively connected to the pose estimator 121 and the motion predictor 122, and may calculate or predict future poses of the electronic device at a plurality of prediction times through a pose of the electronic device estimated by the pose estimator 121 and future motions of the electronic device at the plurality of prediction times.

According to an embodiment, the pose calculator 123 may predict or calculate a future pose of the electronic device through a motion model (or 'a pose prediction model') including a relational expression between a pose of the electronic device and a motion of the electronic device. For example, the pose calculator 123 may calculate or predict a future pose of the electronic device by applying a current pose of the electronic device received from the pose estimator 121 and a future motion of the electronic device received from the motion predictor 122 to a motion model.

In one example, the pose calculator 123 may calculate or predict a pose of the electronic device at a first prediction time by applying a current pose of the electronic device and a future motion of the electronic device at the first prediction time to a motion model.

In another example, the pose calculator 123 may calculate or predict a pose of the electronic device at a second prediction time by applying a pose of the electronic device at a first prediction time and a future motion of the electronic device at the second prediction time to the motion model. However, a detailed description of a process of calculating or predicting a future pose of the electronic device by the pose calculator 123 will be described later.

In the drawing, an embodiment in which only the pose estimator 121, the motion predictor 122, and the pose calculator 123 of the processor 120 are separated is presented, however, the configuration of the processor 120 according to the present embodiment is not limited thereto. According to an embodiment, the pose estimator 121, the motion predictor 122, and the pose calculator 123 of the processor 120 may be implemented in the form of a single chip.

Figure 6:
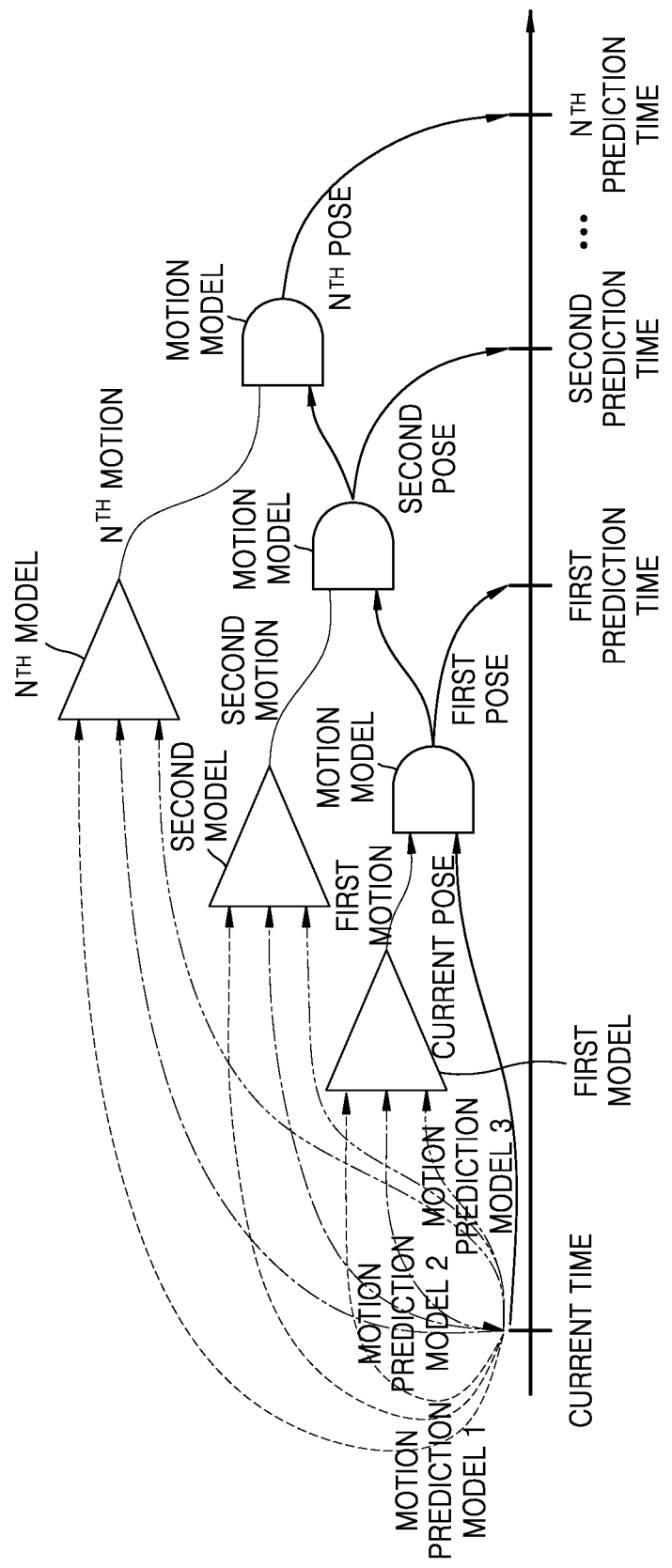
FIG. 6 is a diagram for describing a method of predicting a future pose of an electronic device at a plurality of prediction times of the electronic device, according to an embodiment.

FIG. 6 is a diagram for describing a method of predicting a future pose of an electronic device at a plurality of prediction times of the electronic device, according to an embodiment.

Referring to FIG. 6, the electronic device (e.g., the electronic device 100 of FIGS. 1 and 3) according to an embodiment may predict a future motion of the electronic device at a plurality of prediction times, and may predict or calculate a future pose of the electronic device at a plurality of prediction times through the predicted future motion.

According to an embodiment, a processor of the electronic device (e.g., the processor 120 of FIG. 3) may divide a maximum prediction time during which a pose prediction of the electronic device is possible into N prediction times (where N is a natural number), and may predict a motion of the electronic device at each prediction time. For example, the processor may acquire a model in which a plurality of motion prediction models stored in a memory (e.g., the memory 130 of FIG. 3) are combined or fused at each prediction time, and may predict a future motion of the electronic device through the acquired model.

In one example, the processor may acquire a first model for predicting a motion of the electronic device at a first prediction time by combining or fusing a plurality of motion prediction models, and may predict a first motion of the electronic device at the first prediction time by applying estimated data for a current pose of the electronic device and external data acquired through a data acquisition device to the first model.

In another example, the processor may acquire a second model for predicting a motion of the electronic device at a second prediction time by combining or fusing a plurality of motion prediction models, and may predict a second motion of the electronic device at the second prediction time by applying estimated data for a current pose of the electronic device and external data to the second model.

In the present disclosure, the '$i^{th}$ model (here, i is a natural number)' denotes a model acquired by combining or fusing optimal motion prediction models at the $i^{th}$ prediction time, and the processor may accurately predict a motion of the electronic device at the $i^{th}$ prediction time through the $i^{th}$ model.

According to an embodiment, the processor may predict or calculate a future pose of the electronic device at a plurality of prediction times by applying a motion of the electronic device at the plurality of prediction times and an estimated pose of the electronic device or a predicted pose of the electronic device to a motion model.

For example, the processor may predict or calculate a future pose of the electronic device through a motion model including a relational expression as shown in Equation 1 below.

$$\hat{p}_t^{(i+1)} = \hat{p}_t^{(i)} + \hat{m}_t^{(i)}$$ [Equation 1]

In Equation 1, $\hat{p}_t^{(i)}$ denotes a vector representing a pose of the electronic device at an $i^{th}$ prediction time, $\hat{m}_t^{(i)}$ denotes a vector representing a motion of the electronic device at an $i+1^{th}$ prediction time predicted by the processor, and $\hat{p}_t^{(i+1)}$ denotes a vector representing a pose of the electronic device at the $i+1^{th}$ prediction time.

In one example, the processor may calculate or predict a first pose $\hat{p}_t^{(1)}$ of the electronic device at a first prediction time by applying a first motion $\hat{m}_t^{(0)}$) of the electronic device at the first prediction time and a current pose $\hat{p}_t^{(0)}$ of the electronic device to a motion model. In the present disclosure, the 'first prediction time' may denote a prediction time closest to the current time among a plurality of divided prediction times, and, hereinafter, the corresponding expression may be used to have the same meaning. In this case, when the processor predicts or calculates the first pose of the electronic device at the first prediction time, the processor may use data about a motion and a current pose of the electronic device stored in the memory, but is not limited thereto.

In another example, the processor may predict or calculate a second pose $\hat{p}_t^{(2)}$ of the electronic device at the second prediction time by applying a second motion $\hat{m}_t^{(0)}$) of the electronic device at the second prediction time and a first pose $\hat{p}_t^{(1)}$ of the electronic device at a first prediction time to a motion model.

That is, the electronic device according to an embodiment may predict a future motion of the electronic device at a plurality of prediction times through the operation of the processor described above, and may predict or calculate a pose of the electronic device at the plurality of prediction times through a relationship between a predicted motion and a pose of the electronic device.

Figure 7:
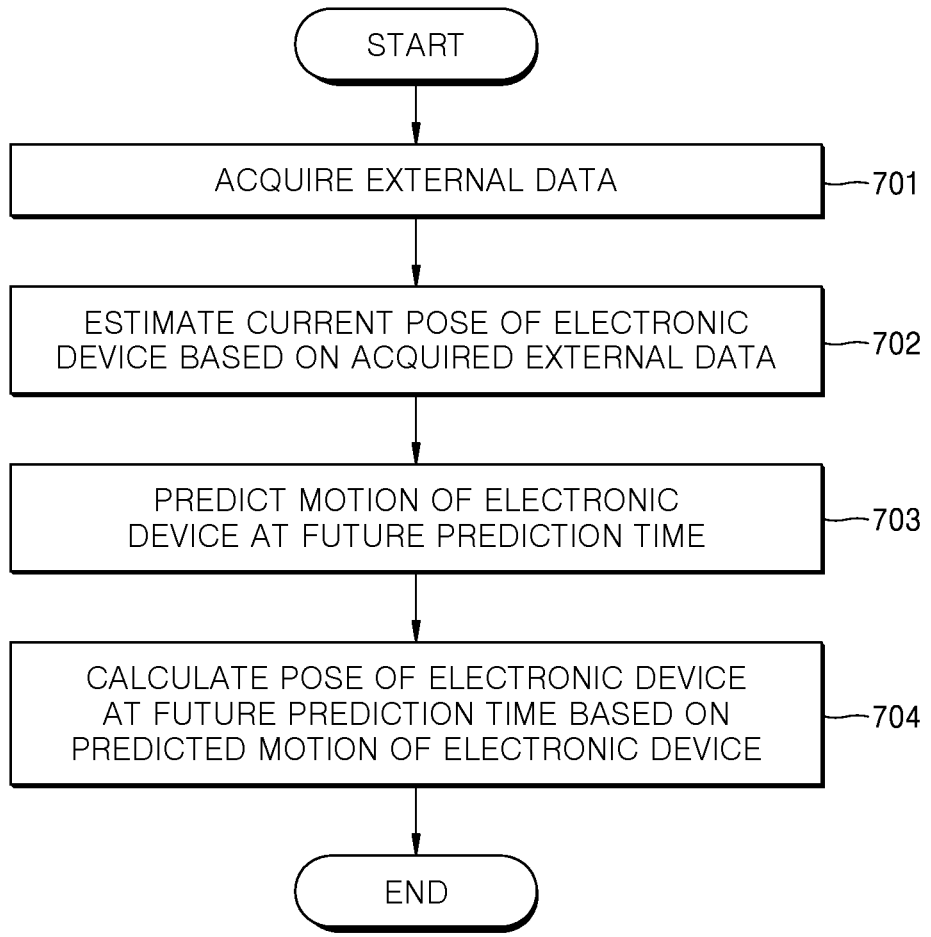
FIG. 7 is a flowchart illustrating a method of calculating a pose at a plurality of prediction times of an electronic device according to an embodiment.

FIG. 7 is a flowchart for describing a method of calculating a pose at a plurality of prediction times of an electronic device according to an embodiment. FIG. 7 illustrates an operation method for calculating a pose at a plurality of predicted times of the electronic device 100 illustrated in FIGS. 1 to 3.

Referring to FIG. 7, in operation 701, the electronic device according to an embodiment (e.g., the electronic device 100 of FIGS. 1 and 3) may acquire external data through a data acquisition device (e.g., the data acquisition device 110 of FIG. 3). For example, the electronic device may acquire image data about objects surrounding the electronic device and/or inertia data corresponding to the movement of the electronic device through the data acquisition device, but is not limited thereto.

In operation 702, a processor (e.g., the processor 120 of FIGS. 1 and 3) of the electronic device according to an embodiment may receive the external data acquired from the data acquisition device, and may estimate a current pose of the electronic device based on the external data. However, a detailed description of an operation of estimating the current pose of the electronic device by the processor will be described later.

In operation 703, the processor of the electronic device according to an embodiment may predict a motion of the electronic device at a future prediction time based on the external data acquired in operation 701 and the current pose of the electronic device estimated in operation 702.

In one example, the processor may acquire a first model by combining or fusing a plurality of motion prediction models to predict a first motion of the electronic device at a first prediction time, and may predict the first motion of the electronic device at the first prediction time by applying the external data and a current pose of the electronic device to the acquired first model.

The plurality of motion prediction models may include, for example, a model for predicting a future motion based on a current pose of the electronic device and a model for predicting a future motion through machine learning, but is not limited thereto.

In another example, the processor may acquire a second model by combining or fusing a plurality of motion prediction models to predict a second motion of the electronic device at a second prediction time, and may predict the second motion of the electronic device at the second prediction time by applying external data and a current pose of the electronic device to the acquired second model.

In this case, the processor may acquire the first model and/or the second model through a weighted average of a plurality of motion prediction models, but a detailed description thereof will be provided below.

In operation 704, the processor of the electronic device according to an embodiment may calculate or predict a pose of the electronic device at a future prediction time based on a current pose of the electronic device estimated in operation 702 and/or a motion of the electronic device predicted in operation 703.

In an example, the processor may predict or calculate a first pose of the electronic device at a first prediction time by applying a current pose of the electronic device and a first motion of the electronic device at the first prediction time to a motion model.

In another example, the processor may predict or calculate a second pose of the electronic device at a second prediction time by applying a predicted first pose of the electronic device and a second motion of the electronic device at the second prediction time to the motion model.

Hereinafter, an operation method for predicting a current pose of the electronic device and predicting a future motion and pose will be described in detail with reference to FIGS. 8 to 9.

Figure 8:
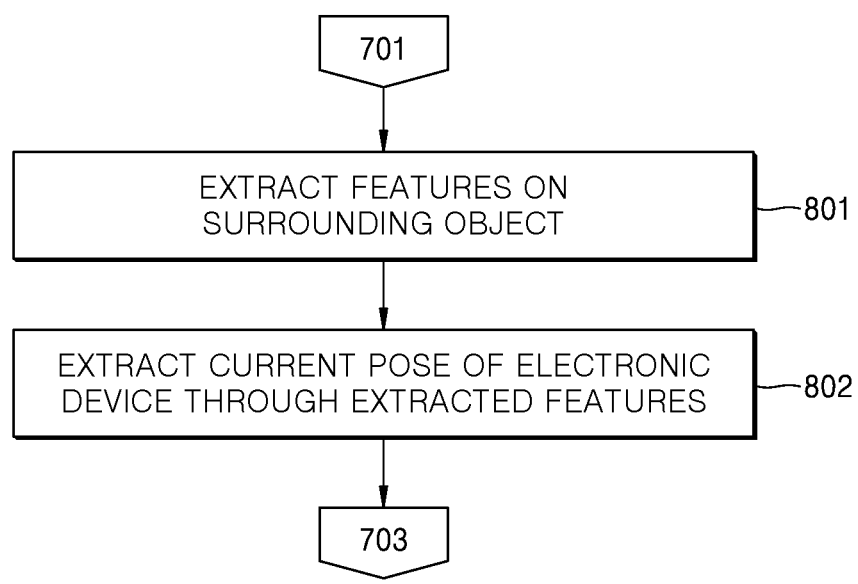
FIG. 8 is a flowchart for describing a method of estimating a current pose of an electronic device according to an embodiment.

FIG. 8 is a flowchart illustrating a method of estimating a current pose of an electronic device according to an embodiment. FIG. 8 is a flowchart for specifically explaining the operation 702 of FIG. 7.

Referring to FIG. 8, in operation 801, a processor (e.g., the processor 120 of FIGS. 1 and 3) of an electronic device (e.g., the electronic device 100 of FIGS. 1 and 3) according to an embodiment may extract features on surrounding objects through external data acquired in the operation 701 through a data acquisition device (e.g., the data acquisition device 110 of FIG. 3).

For example, the processor may extract features from an image of a surrounding object acquired through a feature extraction algorithm, but is not limited thereto.

In operation 802, the processor of the electronic device according to an embodiment may estimate a current pose of the electronic device through the features extracted in operation 801. For example, the processor may generate optimal data (or 'optimal solution') with reduced errors by performing Kalman filtering or bundle adjustment on the features extracted in operation 801, and may estimate a current pose of the electronic device through the generated optimal data.

Figure 9:
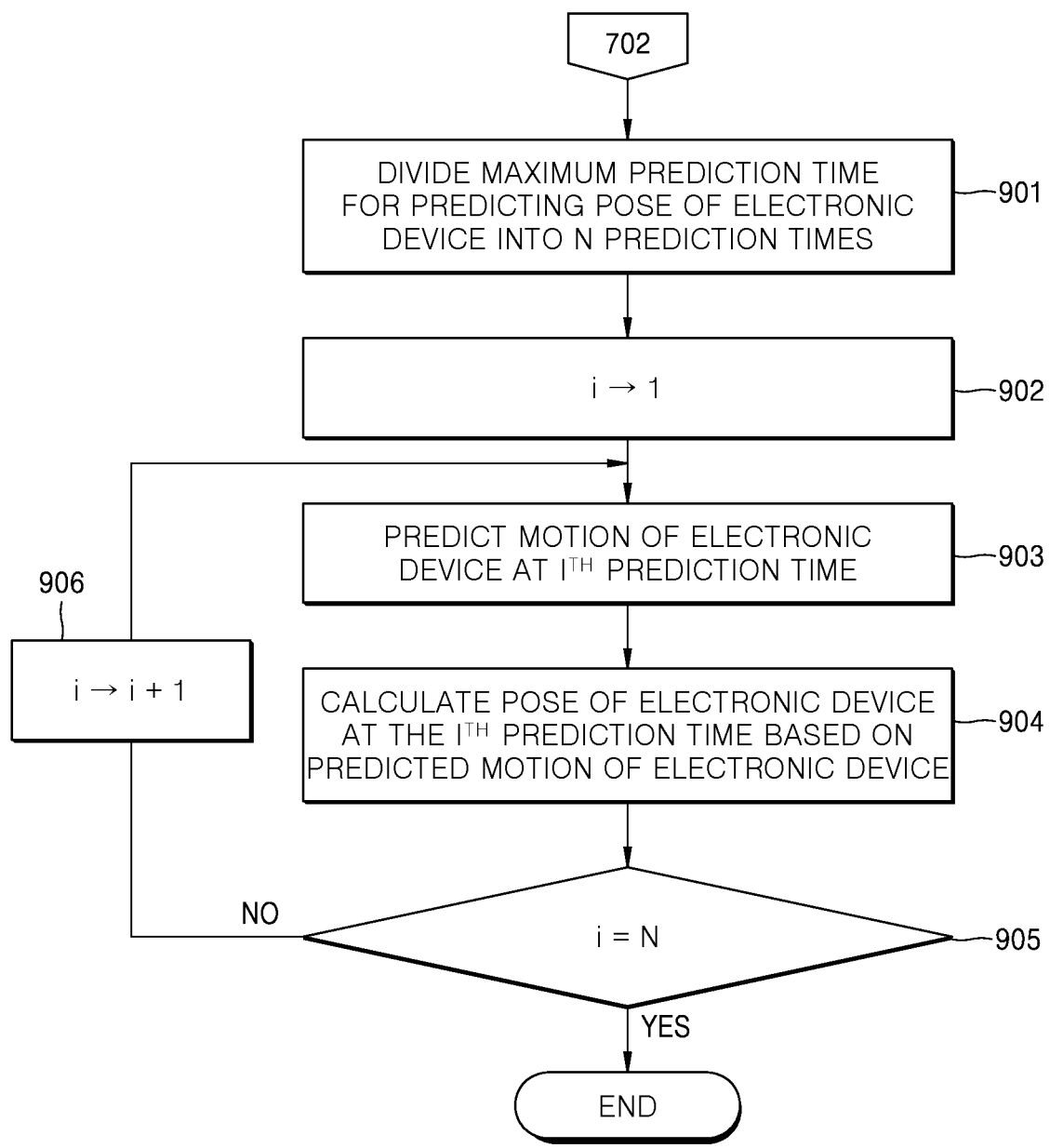
FIG. 9 is a flowchart for describing a method of predicting a motion and calculating a pose at a plurality of prediction times of an electronic device according to an embodiment.

FIG. 9 is a flowchart for explaining a method of predicting a motion and calculating a pose at a plurality of prediction times of an electronic device according to an embodiment. FIG. 9 is a flowchart for specifically explaining operations 703 and 704 of FIG. 7.

Referring to FIG. 9, in operation 901, a processor (e.g., the processor 120 of FIGS. 1 and 3) of an electronic device (e.g., the electronic device 100 of FIGS. 1 and 3) according to an embodiment may divide a maximum prediction time during which a future pose of the electronic device may be predicted into a plurality of prediction times. For example, the processor may divide the maximum prediction time into N prediction times.

In operation 902, the processor of the electronic device according to an embodiment may set the value of i to 1. For example, by setting the value of i to 1 through operation 902 described above, in operation 903, which will be described below, the processor may preferentially predict a motion and pose of the electronic device at a first prediction time closest to a current time.

In operation 903, the processor of the electronic device according to an embodiment may predict a motion of the electronic device at an $i^{th}$ prediction time. As the value of i is set to 1 in operation 902, the processor may predict a first motion of the electronic device at the first prediction time.

For example, the processor may acquire a first model by combining or fusing a plurality of motion prediction models stored in a memory (e.g., the memory 130 of FIG. 3), and may predict the first motion at the first prediction time by applying external data acquired through a data acquisition device (e.g., the data acquisition device of FIG. 3) and a current pose of the electronic device estimated in operation 702 to the first model.

In operation 904, the processor of the electronic device according to an embodiment may predict or calculate a pose of the electronic device at the $i^{th}$ prediction time based on a motion of the electronic device at the $i^{th}$ prediction time predicted in operation 903.

According to an embodiment, the processor may predict or calculate a first pose of the electronic device at the first prediction time by applying the current pose of the electronic device predicted in operation 702 and the first motion of the electronic device predicted in operation 903 to a motion model. For example, the processor may predict or calculate the first pose through a relationship between the first motion indicating change or average change in pose of the electronic device from the current time to the first prediction time and the current pose of the electronic device.

In operation 905, the processor of the electronic device according to an embodiment may compare a value of i with N corresponding to the number of prediction times. For example, the processor may determine whether the current value of i is equal to N.

When it is determined that the value of i in operation 905 is not equal to the value of N, in operation 906, the processor of the electronic device according to an embodiment increases the value of i by 1, and operations 903 to 905 may be repeated.

According to an embodiment, the processor may increase the value of i set to 1 in operation 902 to 2 and may predict a motion and pose of the electronic device at a second prediction time. For example, the processor may acquire a second model by combining or fusing a plurality of motion prediction models, and may predict a second motion of the electronic device at the second prediction time by applying external data and a current pose of the electronic device to the second model. Also, the processor may predict or calculate a second pose of the electronic device at the second prediction time by applying the first motion of the electronic device at the first prediction time and the second motion of the electronic device at the second prediction time to the motion model.

The processor of the electronic device according to an embodiment may predict from a motion of the electronic device at the first prediction time to a motion of the electronic device at the $N^{th}$ prediction time by repeatedly performing operations 903 to 906 described above.

When the prediction or calculation of the motion of the electronic device at the $N^{th}$ prediction time is completed, it may be determined that the value of i in operation 906 is equal to N, and the processor of the electronic device according to an embodiment may terminate the operation of predicting a pose of the electronic device.

That is, the electronic device according to an embodiment may predict a pose of the electronic device at a plurality of prediction times through the operation 901 to the operation 906 described above. Thus, as a result, the electronic device may accurately predict a pose even in an environment in which the timing of predicting the pose of the electronic device is variable.

Figure 10:
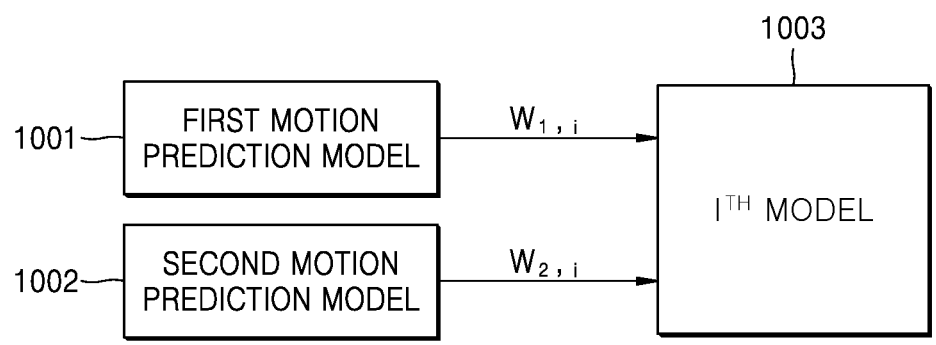
FIG. 10 is a diagram for describing a method of combining a plurality of motion prediction models of an electronic device according to an embodiment.

FIG. 10 is a diagram for describing a method of combining a plurality of motion prediction models of an electronic device according to an embodiment.

Referring to FIG. 10, an electronic device (e.g., the electronic device 100 of FIGS. 1 and 3) according to an embodiment may acquire a model or fusion model for implementing an optimal motion prediction performance by combining or fusing a plurality of motion prediction models for each of a plurality of prediction times.

In the present disclosure, the 'motion prediction performance' refers to an index indicating an error between a predicted motion and an actual motion. The greater the motion prediction performance, the less the error between the predicted motion and the actual motion. Also, the less the motion prediction performance, the greater the error between the predicted motion and the actual motion.

According to an embodiment, the plurality of motion prediction models may include a first motion prediction model 1001 for predicting a future motion of the electronic device through a current pose of the electronic device and a second motion prediction model 1002 for predicting a future motion of the electronic device through a machine learning.

In one embodiment, the first motion prediction model 1001 may predict a future motion of the electronic device by assuming that the electronic device maintains a current pose or movement. In one example, the first motion prediction model 1001 may predict the motion of the electronic device at the prediction time by assuming that the electronic device maintains a current speed (or angular velocity) and moves at a constant velocity (or moves at a constant angular velocity), but is not limited thereto. In another example, the first motion prediction model 1001 may predict a motion of the electronic device at a prediction time by assuming that the electronic device moves with constant acceleration (or with uniform acceleration).

In another embodiment, the first motion prediction model 1001 may predict a motion of the electronic device at a prediction time by assuming that the current velocity (or angular velocity) and/or the current acceleration (or angular acceleration) of the electronic device exponentially decreases. In another embodiment, the first motion prediction model 1001 may predict a motion of the electronic device at a prediction time through a Kalman filter or an extended Kalman filter.

The second motion prediction model 1002 may predict a future motion of the electronic device by acquiring data required for learning and performing a machine learning based on the acquired data.

In one embodiment, the second motion prediction model 1002 may perform a machine learning through external data acquired from the data acquisition device (e.g., the data acquisition device 110 of FIG. 3) and a pose of the electronic device estimated through a processor (e.g., the processor 120 of FIG. 3), and may predict a future motion of the electronic device based on the learning result.

In one example, the second motion prediction model 1002 may form a network by setting at least one hidden layer between a current pose and a future motion of the electronic device, and may acquire a hidden layer matrix by repeatedly performing a machine learning using external data and an estimated pose of the electronic device. The second motion prediction model 1002 may include the hidden layer matrix described above, and may predict a future motion of the electronic device through the hidden layer matrix.

In another example, the second motion prediction model 1002 assumes that there is a relational expression between the current pose and the future motion of the electronic device, and may acquire a relational expression between the current pose and the future motion of the electronic device by analyzing external data acquired by the data acquisition device and a pose of the electronic device estimated through the processor. The second motion prediction model 1002 may include a relational expression between a current pose and a future motion of the electronic device, and a motion of the electronic device may be predicted through the relational expression described above.

For example, the second motion prediction model 1002 may include at least one of a model for predicting a future motion through regression analysis, a model for predicting a future motion through an artificial neural network (ANN), a model for predicting a future motion through a deep neural network (DNN), a model for predicting a future motion through a convolutional neural network (CNN), and a model for predicting a future motion through a recurrent neural network (RNN), but is not limited thereto.

When a future pose of the electronic device is predicted through only the first motion prediction model 1001, complicated characteristics of motion change of the electronic device may not be reflected. On the other hand, when a future pose of the electronic device is predicted through only the second motion prediction model 1002, a situation in which the precision of motion prediction may be greatly reduced may occur under certain conditions.

The electronic device according to an embodiment may acquire an optimal model by combining or fusing the first motion prediction model 1001 and the second motion prediction model 1002 at each prediction time, and may accurately predict a future motion of the electronic device through the acquired model.

According to an embodiment, the processor of the electronic device may acquire an $i^{th}$ model 1003 for predicting a motion of the electronic device at an $i^{th}$ prediction time (where i is a natural number) through a weighted average of the first motion prediction model 1001 and the second motion prediction model 1002.

The processor may determine a weight capable of exhibiting optimal motion prediction performance according to a prediction time, and may acquire the $i^{th}$ model 1003 for acquiring a motion of the electronic device at the $i^{th}$ prediction time based on the determined weight. For example, the processor may acquire the $i^{th}$ model 1003 by giving a first weight $W_{1,i}$ to the first motion prediction model 1001 and a second weight $W_{2,i}$ to the second motion prediction model 1002. In this case, a motion of the electronic device at the $i^{th}$ prediction time predicted through the $i^{th}$ model may be expressed as Equation 2 below.

$$\hat{m}_t^{(i)} = (1-\alpha_i)\tilde{m}_t + \alpha_i m_t^{(i)} = W_{1,i} m_t + W_{2,i} \tilde{m}_t^{(i)} \qquad \text{[Equation 2]}$$

In Equation 2, $m_t$ denotes a motion of the electronic device at the $i^{th}$ prediction time predicted through the first motion prediction model 1001, and re denotes a motion of the electronic device at the $i^{th}$ prediction time predicted through the second motion prediction model 1002. Also, $\alpha_i$ denotes a prediction coefficient at the $i^{th}$ prediction time, and $\alpha_i$ may be a number between 0 and 1. In this case, a weighted average value regarding the pose of the electronic device may be acquired by using an Euler angle or an angle-axis expression method, but is not limited thereto.

The processor may select a prediction coefficient capable of exhibiting optimal motion prediction performance according to each prediction time, and may control the first weight $W_{1,i}$ assigned to the first motion prediction model 1001 and the second weight $W_{2,i}$ assigned to the second motion prediction model 1002 based on the selected prediction coefficient.

Also, the processor may predict a motion of the electronic device at the $i^{th}$ prediction time by applying external data acquired through the data acquisition device and a current pose of the electronic device to the acquired $i^{th}$ model 1003.

Hereinafter, an operation of adjusting the first weight and the second weight according to a prediction time of the processor will be described in detail with reference to FIGS. 11, 12, and 13.

Figure 11:
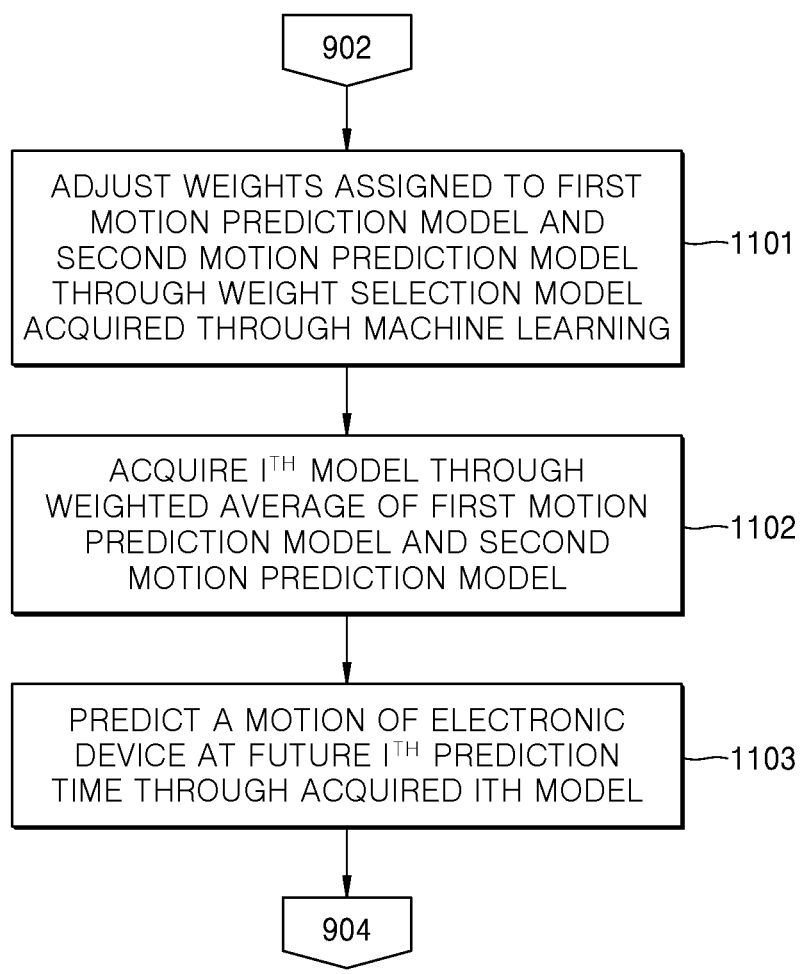
FIG. 11 is a flowchart for describing a method of predicting a motion by combining a plurality of motion prediction models of an electronic device according to an embodiment.

FIG. 11 is a flowchart for describing a method of predicting a motion by combining a plurality of motion prediction models of an electronic device according to an embodiment. FIG. 12 is a diagram for describing a method of adjusting weights assigned to a plurality of motion prediction models through a recurrent neural network model.

Figure 12:
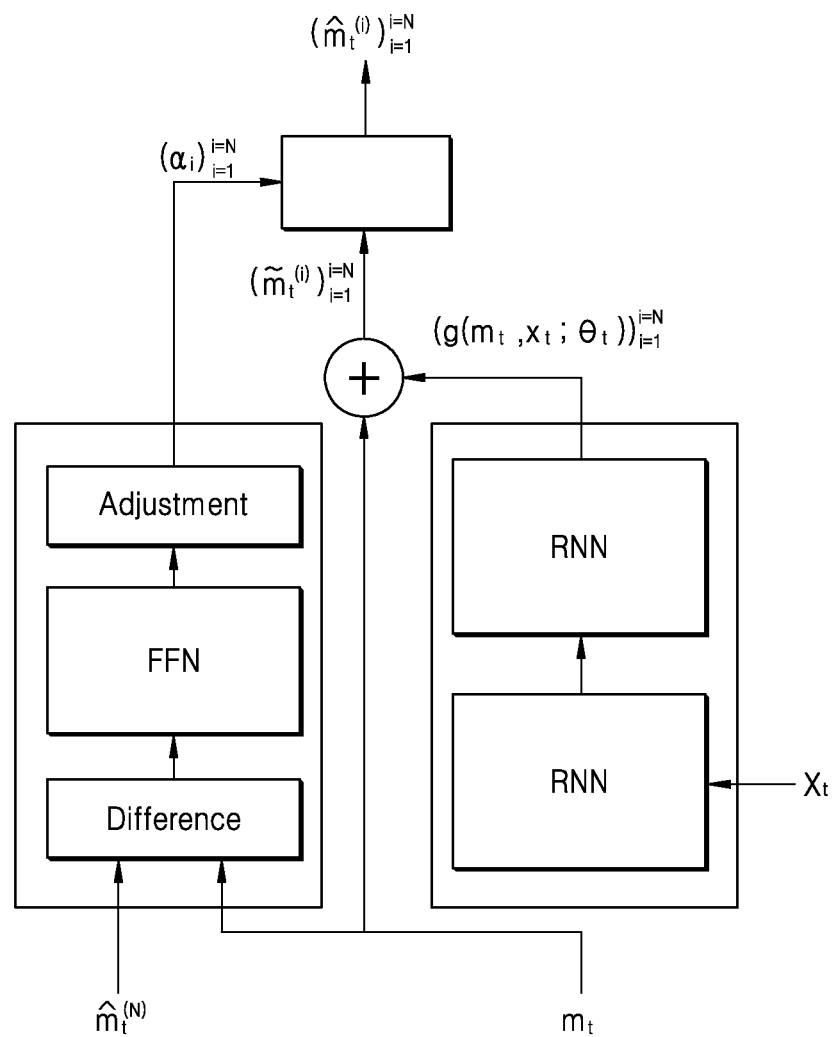
FIG. 12 is a diagram for explaining a method of controlling a weight assigned to a plurality of motion prediction models through a recurrent neural network model.

FIG. 11 is a flowchart for specifically explaining operation 903 of FIG. 9, and FIG. 12 shows a process of calculating a prediction coefficient $\alpha_i$ through a feedforward network (FFN) in a stacked recurrent neural network structure. Hereinafter, the method of predicting a motion by combining a plurality of motion prediction models of FIG. 11 will be described with reference to FIG. 12.

Referring to FIG. 11, in operation 1101, a processor (e.g., the processor 120 of FIG. 3) of an electronic device (e.g., the electronic device 100 of FIGS. 1 and 3) according to an embodiment may adjust weights assigned to a plurality of motion prediction models through a weight selection model acquired through machine learning.

In the present disclosure, the 'weight selection model' may denote a model for selecting a weight capable of exhibiting an optimal prediction performance at each prediction time, and, hereinafter, the corresponding expression may be used to have the same meaning.

According to an embodiment, the processor may adjust a first weight (e.g., the first weight $W_{1,i}$ of FIG. 10) assigned to a first motion prediction model (e.g., the first motion prediction model 1001 of FIG. 10) and a second weight (e.g., the second weight $W_{2,i}$ of FIG. 10) assigned to a second motion prediction model (e.g., the second motion prediction model 1002 of FIG. 10) through a weight selection model acquired through machine learning. For example, the processor may select a first weight and a second weight capable of exhibiting an optimal prediction performance at an $i^{th}$ prediction time (where i is a natural number) through the weight selection model, and adjust the first weight and the second weight based on the selection result.

Referring to FIG. 12, in one embodiment, the weight selection model may be acquired through a recurrent neural network (RNN).

The RNN may acquire data on a velocity, angular velocity, and angle (or acceleration) of the electronic device, and may perform learning (or 'residual learning') through the acquired data. For example, the RNN may calculate the velocity and the amount of change in the angular velocity of the electronic device, and may perform learning by using the angle (or acceleration) as an additional input. In addition, the RNN sets a prediction coefficient $\alpha_i$ for adjusting the amount of change in the speed and angular velocity of the electronic device, and learns weight values assigned to a plurality of motion prediction models by calculating the prediction coefficient $\alpha_i$ through Equation 3 below.

$$\hat{m}_t^{(i)} = m_t + \alpha_i g(m_t, x_t; \theta_i) =$$
$$(1-\alpha_i)m_t + \alpha_i(m_t + g(m_t, x_t; \theta_i)) = (1-\alpha_i)m_t + \alpha_i \tilde{m}_t^{(i)}$$

[Equation 3]

In Equation 3, $x_t$ may denote a state variable of an RNN or an electronic device, and $\theta_i$ may denote an additional input value (angle or acceleration value). In addition, $m_t$ denotes a motion of the electronic device at the $i^{th}$ prediction time predicted through a first motion prediction model, and $\tilde{m}_t^{(i)}$ is a motion of the electronic device at the $i^{th}$ prediction time predicted through a second motion prediction model.

In the case of a model (e.g., the second motion prediction model 1002 of FIG. 10) in which a future motion of an electronic device is predicted through machine learning, the model may operate in an unintended way with respect to new data, resulting in a situation in which prediction stability is deteriorated. In particular, because a situation with deteriorated prediction stability may mainly occur in an initial prediction stage, in the initial prediction stage, there is a need to increase the size of a weight assigned to a stable model (e.g., the first motion prediction model 1001 in FIG. 10) than a model for predicting a future motion of an electronic device through machine learning.

Accordingly, the RNN may perform learning in a manner of increasing the prediction coefficient $\alpha_i$ (or 'second weight') as the prediction time is away from the current time, or setting the prediction coefficient $\alpha_i$ (or 'second weight') to 0 at the initial prediction time (e.g., the first prediction time), and a weight selection model may be acquired through the learning process described above.

In the embodiment described above, only the process of acquiring a weight selection model through the RNN is disclosed, but the method of acquiring the weight selection model is not limited to the embodiment described above. In another embodiment, the weight selection model may be acquired through at least one of regression analysis, an artificial neural network, a deep neural network, and a convolutional neural network.

In operation 1102, the processor of the electronic device according to an embodiment may acquire an $i^{th}$ model for predicting a motion of the electronic device at an $i^{th}$ prediction time through a weighted average of the first motion prediction model and the second motion prediction model.

For example, the processor may acquire the $i^{th}$ model based on the first weight and the second weight adjusted in operation 1101.

In operation 1103, the processor of the electronic device according to an embodiment may predict a motion of the electronic device at a future $i^{th}$ prediction time through the $i^{th}$ model acquired in operation 1102. For example, the processor may predict a motion of the electronic device at the $i^{th}$ prediction time by applying an estimated current pose of the electronic device and external data acquired through a data acquisition device (e.g., the data acquisition device 110 of FIG. 3) to the $i^{th}$ model.

The electronic device according to an embodiment may predict or calculate a pose of the electronic device at the $i^{th}$ prediction time by applying a motion of the electronic device at the $i^{th}$ prediction time predicted in operation 1103 and a pose of the electronic device at the $i-1^{th}$ prediction time to a motion model. In this case, when the value of i is 1, the electronic device may predict or calculate a pose of the electronic device at the first prediction time by applying a motion of the electronic device at the first prediction time and a current pose of the electronic device to a motion model.

The electronic device according to an embodiment may predict a future motion of the electronic device by selecting a weight capable of exhibiting an optimal prediction performance for each prediction time through operations 1101 to 1103 described above, and may accurately predict a future pose of the electronic device through the predicted future motion of the electronic device.

TABLE 1

| prediction time | Embodiment 1 | Embodiment 2 | Embodiment 3 | Embodiment 4 | Embodiment 5 |
|---|---|---|---|---|---|
| 5 ms | 0.2228 | 0.2205 | 0.2205 | 0.2236 | 0.2180 |
| 10 ms | 0.4485 | 0.4560 | 0.4560 | 0.4495 | 0.4428 |
| 15 ms | 0.6757 | 0.6760 | 0.7015 | 0.6758 | 0.6724 |
| 20 ms | 0.9031 | 0.9033 | 0.9528 | 0.9014 | 0.9049 |
| 25 ms | 1.1198 | 1.1242 | 1.2070 | 1.1162 | 1.1352 |
| 30 ms | 1.3133 | 1.3258 | 1.4624 | 1.3081 | 1.3565 |
| 35 ms | 1.4936 | 1.5124 | 1.7174 | 1.4868 | 1.5641 |
| 40 ms | 1.6829 | 1.7010 | 1.9764 | 1.6763 | 1.7706 |
| 45 ms | 1.8802 | 1.8976 | 2.2470 | 1.8724 | 1.9829 |
| 50 ms | 2.0831 | 2.0999 | 2.5282 | 2.0745 | 2.2008 |

TABLE 2

| prediction time | Embodiment 1 | Embodiment 2 | Embodiment 3 | Embodiment 4 | Embodiment 5 |
|---|---|---|---|---|---|
| 5 ms | 0.0076 | 0.0067 | 0.0067 | 0.0065 | 0.0057 |
| 10 ms | 0.0150 | 0.0165 | 0.0165 | 0.0134 | 0.0126 |
| 15 ms | 0.0238 | 0.0237 | 0.0300 | 0.0229 | 0.0217 |
| 20 ms | 0.0342 | 0.0333 | 0.0474 | 0.0350 | 0.0331 |
| 25 ms | 0.0481 | 0.0464 | 0.0687 | 0.0504 | 0.0472 |
| 30 ms | 0.0638 | 0.0619 | 0.0940 | 0.0678 | 0.0637 |
| 35 ms | 0.0819 | 0.0801 | 0.1231 | 0.0869 | 0.0820 |
| 40 ms | 0.1028 | 0.1007 | 0.1562 | 0.1091 | 0.1030 |
| 45 ms | 0.1263 | 0.1241 | 0.1929 | 0.1334 | 0.1263 |
| 50 ms | 0.1510 | 0.1488 | 0.2331 | 0.1595 | 0.1514 |

Table 1 shows position errors (mm) of the electronic device at a plurality of prediction times according to a weight selection method, and Table 2 shows pose errors)(°) (or 'angle error') of the electronic device at a plurality of prediction times according to a weight selection method.

In Tables 1 and 2, 'Embodiment 1' may denote an embodiment in which a future pose of the electronic device is predicted by adjusting a weight through a weight selection model of the electronic device according to an embodiment, and 'Example 2' may denote an embodiment in which a method of setting the initial prediction coefficient to 0 is added to Embodiment 1.

In addition, 'Embodiment 3' may refer to an existing embodiment for predicting a future pose of an electronic device by using only the first motion prediction model, 'Example 4' may refer to an existing embodiment for predicting a future pose of an electronic device by using only the second motion prediction model, and 'Example 5' may refer to an existing embodiment for predicting a future pose of an electronic device by setting a prediction coefficient to be the reciprocal of an error of a pose at the latest prediction time.

Referring to Tables 1 and 2, when a future motion of the electronic device is predicted through only the second motion prediction model, the precision of the pose prediction is generally high, but in some situations (e.g., pose prediction at 30 ms and 35 ms after the current time in Table 2), a situation may occur in which an error between the predicted pose and the actual pose is increased.

On the other hand, the electronic device according to an embodiment may predict a future motion of the electronic device through a weighted average of the first motion prediction model and the second motion prediction model, and may calculate or predict a future pose of the electronic device through the predicted motion, and as a result, a future pose of the electronic device may be stably and precisely predicted.

Figure 13:
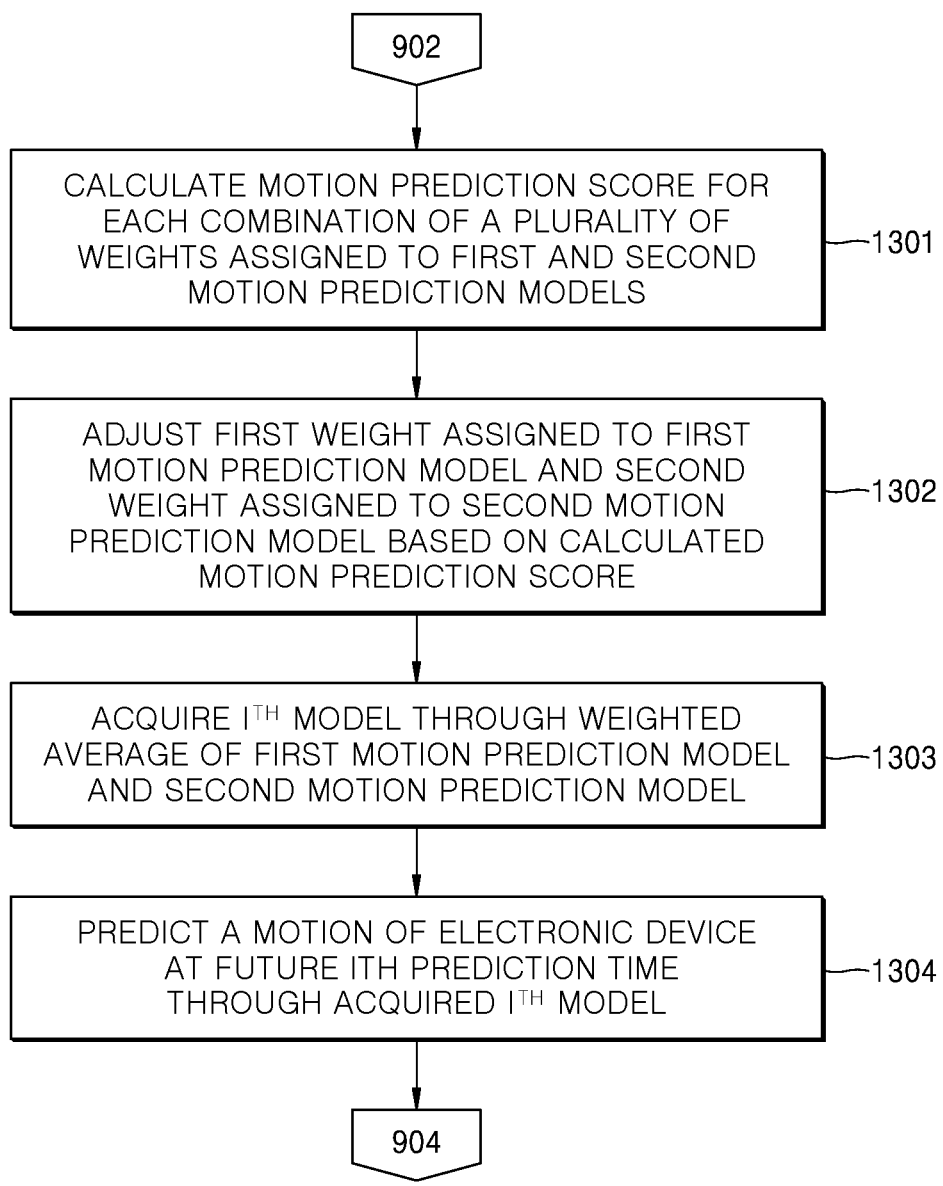
FIG. 13 is a flowchart for describing a method of predicting a motion by combining a plurality of motion prediction models of an electronic device according to another embodiment.

FIG. 13 is a flowchart for describing a method of predicting a motion by combining a plurality of motion prediction models of an electronic device according to another embodiment. FIG. 13 is a flowchart for specifically explaining operation 903 of FIG. 9.

Referring to FIG. 13, in operation 1301, a processor (e.g., the processor 120 of FIGS. 1 and 3) of an electronic device (e.g., the electronic device 100 of FIGS. 1 and 3) according to another embodiment may calculate a motion prediction score for each combination of weights assigned to a plurality of motion prediction models.

In the present disclosure, the 'motion prediction score' may denote an index indicating precision or accuracy of the motion prediction, and the greater the motion prediction score, the less the error between a predicted motion and an actual motion.

According to an embodiment, the processor may calculate a motion prediction score for each combination of a plurality of weights assigned to a first motion prediction model (e.g., the first motion prediction model 1001 of FIG. 10) and a plurality of weights assigned to a second motion prediction model (e.g., the second motion prediction model of FIG. 10). For example, the processor may calculate a motion prediction score for each combination of weights assigned to the first motion prediction model and the second motion prediction model by comparing a motion of the electronic device predicted at a previous time with a motion of the electronic device acquired through a data acquisition device (e.g., the data acquisition device 110 of FIG. 3).

In one example, the processor may calculate a motion prediction score when a weight of 0.1 is assigned to the first motion prediction model and a weight of 0.9 is assigned to the second motion prediction model. In another example, the processor may calculate a motion prediction score when a weight of 0.2 is assigned to the first motion prediction model and a weight of 0.8 is assigned to the second motion prediction model.

In operation 1302, a processor of an electronic device according to another embodiment may adjust a first weight assigned to the first motion prediction model and a second weight assigned to the second motion prediction model based on the motion prediction score calculated in operation 1301. For example, the processor may select a weighted combination with a high motion prediction score calculated in operation 1301 and may adjust the first weight and the second weight to correspond to the selected weight combination.

At an initial prediction time, the precision of motion prediction of a the second motion prediction model may be less than that of a the first motion prediction model, while the precision of motion prediction of the second motion prediction model may be greater than the precision of the first motion prediction model at a prediction time far away from the current time. Accordingly, the processor may increase the size of the second weight assigned to the second motion prediction model as the time when the future motion of the electronic device is predicted is farther from the current time, but is not limited thereto.

In operation 1303, a processor of an electronic device according to another embodiment may acquire an $i^{th}$ model for predicting a motion of the electronic device at an $i^{th}$ prediction time through a weighted average of the first motion prediction model and the second motion prediction model. For example, the processor may acquire the $i^{th}$ model based on a first weight and a second weight adjusted in operation 1302.

In operation 1304, a processor of an electronic device according to another embodiment may predict a motion of the electronic device at a future $i^{th}$ prediction time through the $i^{th}$ model acquired in operation 1303. For example, the processor may predict a motion of the electronic device at the $i^{th}$ prediction time by applying estimated current pose of the electronic device and external data acquired through the data acquisition device to the $i^{th}$ model.

An electronic device according to another embodiment may predict a future motion of the electronic device by selecting a weight capable of exhibiting an optimal prediction performance at each prediction time through operations 1301 to 1304 described above, and may accurately predict a future pose of the electronic device through the predicted future motion of the electronic device.

Figure 14:
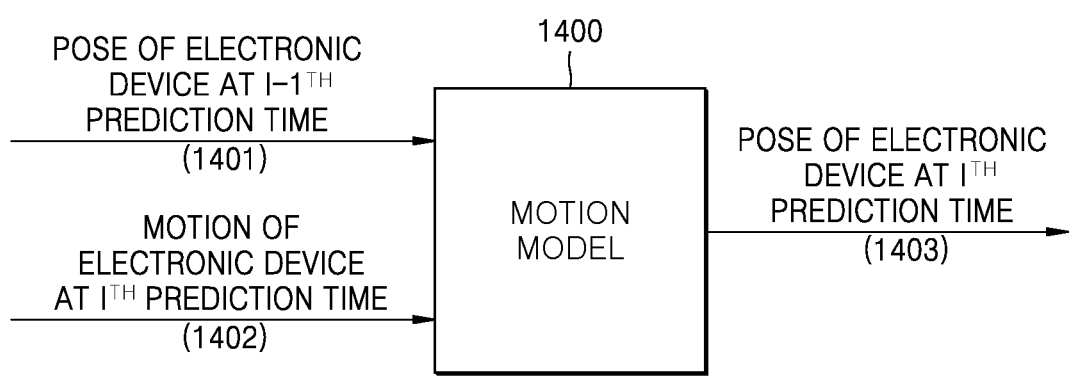
FIG. 14 is a diagram for describing a method of calculating a pose through a motion model of an electronic device according to an embodiment.
Figure 15:
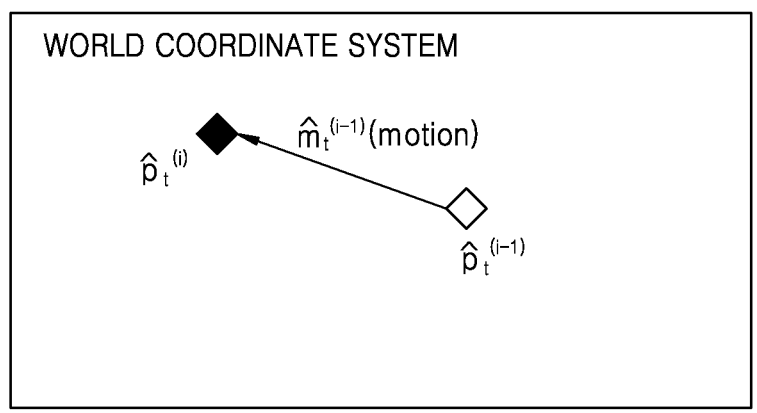
FIG. 15 is a diagram illustrating a correlation between a pose and a motion of an electronic device.

FIG. 14 is a diagram for explaining a method of calculating a pose through a motion model of an electronic device according to an embodiment. FIG. 15 is a diagram illustrating a correlation between a pose and a motion of an electronic device.

Referring to FIGS. 14 and 15, the electronic device (e.g., the electronic device 100 of FIGS. 1 and 3) according to an embodiment may predict or calculate a future pose of the electronic device based on a predicted future motion of the electronic device.

According to an embodiment, a processor (e.g., the processor 120 of FIG. 3) of the electronic device may predict or calculate a pose 1403 (e.g., $\hat{p}_t^{(i)}$ of FIG. 15) of the electronic device at the $i^{th}$ prediction time based on a motion 1402 (e.g., $\hat{m}_t^{(i-1)}$ of FIG. 15) of the electronic device at an $i^1$ prediction time (where i is a natural number) predicted at $i$-$1^{th}$. For example, the processor may calculate a pose 1403 of the electronic device at the $i^{th}$ prediction time by applying a pose 1401 (e.g., $\hat{p}_t^{(i-1)}$ in FIG. 15) of the electronic device at the $i$-$1^{th}$ prediction time and a motion 1402 of the electronic device at the $i^{th}$ prediction time to a motion model 1400. In this case, when the value of i is 1, the processor may predict or calculate a pose (e.g., $\hat{p}_t^{(1)}$) of the electronic device at the first prediction time based on a current pose (e.g., $\hat{p}_t^{(0)}$) stored in a memory (e.g., the memory 130 of FIG. 3) of the electronic device and a motion (e.g., $\hat{m}_t^{(0)}$) of the electronic device at the first prediction time.

According to an embodiment, the motion model 1400 may include a relational expression between a pose and a motion of the electronic device, and when a pose of the electronic device and motion data of the electronic device are input, a pose of the electronic device may be predicted or calculated through the relational expression described above. In this case, a relationship between a pose and a motion of the electronic device may be expressed in the form of an addition of a vector representing the pose 1401 of the electronic device at the i-1$^{th}$ prediction time and a vector $\hat{m}_t^{(i-1)}$ representing the motion 1402 of the electronic device at the i$^{th}$ prediction time, but is not limited thereto.

In one example, the processor may predict or calculate a first pose of the electronic device at the first prediction time by applying a current pose of the electronic device and a first motion of the electronic device at the predicted first prediction time to a motion model.

In another example, the processor may predict or calculate a second pose of the electronic device at the second prediction time by applying a first pose of the electronic device at the first prediction time and a second motion of the electronic device at the second prediction time to a motion model.

In another example, the processor may predict or calculate an N$^{th}$ pose of the electronic device at an N$^{th}$ prediction time by applying an N-1 pose of the electronic device at the N-1 prediction time (where N is a natural number equal to or greater than 2) and an N$^{th}$ motion of the electronic device at a predicted N$^{th}$ prediction time to a motion model.

Meanwhile, the operation methods of FIGS. 7, 8, 9, 11, and 13 described above may be recorded in a computer-readable recording medium in which one or more programs including instructions for executing the method are recorded. Examples of non-transitory computer-readable recording medium include magnetic media, such as hard disks, floppy disks, and magnetic tapes, optical media, such as CD-ROMs and DVDs, magneto-optical media, such as floppy disks, and hardware devices specially configured to store and execute program instructions, such as ROM, RAM, flash memory, and the like. Examples of program instructions include not only machine language codes, such as those generated by a compiler, but also high-level language codes that may be executed by a computer using an interpreter or the like.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device comprising:
   a memory storing a plurality of motion prediction models; and
   a processor configured to:
      estimate a current pose of the electronic device based on external data;
      predict a first motion of the electronic device at a future first prediction time through a first model in which the plurality of motion prediction models are combined for the future first prediction time;
      calculate a first pose of the electronic device at the first prediction time based on the current pose and the first motion;
      predict a second motion of the electronic device at a future second prediction time through a second model in which the plurality of motion prediction models are combined for the future second prediction time; and
      calculate a second pose of the electronic device at the second prediction time based on the first pose and the second motion.

2. The electronic device of claim 1, further comprising:
   a camera configured to acquire image data for surrounding objects; and
   an inertial sensor configured to acquire inertial data of the electronic device,
   wherein the external data comprises at least one of the image data and the inertial data.

3. The electronic device of claim 1, wherein the processor is further configured to extract features from the external data, and estimate the current pose of the electronic device by performing Kalman filtering or bundle adjustment on the extracted features.

4. The electronic device of claim 1, wherein the plurality of motion prediction models include a first motion prediction model for predicting a future motion of the electronic device through the current pose of the electronic device and a second motion prediction model for predicting the future motion of the electronic device through machine learning.

5. The electronic device of claim 4, wherein the second motion prediction model predicts the future motion through at least one of regression analysis, an artificial neural network, a convolutional neural network, and a recurrent neural network.

6. The electronic device of claim 4, wherein the processor is further configured to acquire the first model or the second model through a weighted average of the first motion prediction model and the second motion prediction model.

7. The electronic device of claim 6, wherein the processor is further configured to adjust a first weight assigned to the first motion prediction model and a second weight assigned to the second motion prediction model according to a prediction time of a motion of the electronic device.

8. The electronic device of claim 7, wherein the processor is further configured to adjust the first weight and the second weight based on a weight selection model obtained through machine learning.

9. The electronic device of claim 7, wherein the processor is further configured to
   calculate a motion prediction score indicating precision of motion prediction for each combination of a plurality of weights assigned to the first motion prediction model and a plurality of weights assigned to the second motion prediction model, and
   adjust the first weight and the second weight based on the calculated motion prediction score.

10. The electronic device of claim 7, wherein the processor is further configured to increase a magnitude of the second weight as a time difference between the prediction time of the motion of the electronic device and the current time increases.

11. The electronic device of claim 1, wherein the processor is further configured to calculate the first pose and the second pose through a motion model including a relational expression between a pose of the electronic device and a motion of the electronic device.

12. An operating method of an electronic device, the operating method comprising:
  estimating a current pose of the electronic device based on external data;
  predicting a first motion of the electronic device at a future first prediction time through a first model in which a plurality of motion prediction models are combined for the future first prediction time;
  calculating a first pose of the electronic device at the first prediction time based on the current pose and the first motion;
  predicting a second motion of the electronic device at a future second prediction time through a second model in which the plurality of motion prediction models are combined for the future second prediction time; and
  calculating a second pose of the electronic device at the second prediction time based on the first pose and the second motion.

13. The operating method of claim 12, further comprising:
  acquiring image data for a surrounding object through a camera; and
  acquiring inertia data of the electronic device through an inertia measurement device,
  wherein the image data and the inertia data are acquired as the external data.

14. The operating method of claim 12, wherein the estimating of the current pose includes:
  extracting features from the external data; and
  estimating the current pose of the electronic device by performing Kalman filtering or bundle adjustment on the extracted features.

15. The operating method of claim 12, wherein the plurality of motion prediction models include a first motion prediction model for predicting a future pose of the electronic device through the current pose of the electronic device, and a second motion prediction model for predicting the future pose of the electronic device through machine learning.

16. The operating method of claim 15, wherein the calculating of the first pose includes acquiring the first model through a weighted average of the first motion prediction model and the second motion prediction model.

17. The operating method of claim 16, wherein the calculating of the second pose includes acquiring the second model through the weighted average of the first motion prediction model and the second motion prediction model.

18. The operating method of claim 17, wherein the obtaining of the first model or obtaining of the second model includes:
  adjusting a first weight assigned to the first motion prediction model according to a motion prediction time of the electronic device; and
  adjusting a second weight assigned to the second motion prediction model according to the motion prediction time of the electronic device.

19. The operating method of claim 18, wherein the first weight or the second weight is adjusted by using a weight selection model acquired through machine learning.

20. The operating method of claim 18, wherein the first weight or the second weight is adjusted by using a motion prediction score calculated for each combination of a plurality of weights assigned to the first motion prediction model and a plurality of weights assigned to the second motion prediction model.

* * * * *